United States Patent
Pretz et al.

(10) Patent No.: US 9,687,765 B2
(45) Date of Patent: Jun. 27, 2017

(54) PROCESS AND APPARATUS FOR MINIMIZING ATTRITION OF CATALYST PARTICLES

(71) Applicant: Dow Global Technologies LLC, Midland, MI (US)

(72) Inventors: Matthew Pretz, Lake Jackson, TX (US); Mark W. Stewart, Pearland, TX (US); Don F. Shaw, Denville, NJ (US); Brien A. Stears, League City, TX (US); Madhusudhan M. Kodam, Midland, MI (US); Ben Freireich, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/434,973

(22) PCT Filed: Oct. 14, 2013

(86) PCT No.: PCT/US2013/064753
§ 371 (c)(1),
(2) Date: Apr. 10, 2015

(87) PCT Pub. No.: WO2014/070425
PCT Pub. Date: May 8, 2014

(65) Prior Publication Data
US 2015/0298037 A1    Oct. 22, 2015

Related U.S. Application Data

(60) Provisional application No. 61/720,582, filed on Oct. 31, 2012.

(51) Int. Cl.
*B01D 45/16* (2006.01)
*B04C 3/00* (2006.01)
(Continued)

(52) U.S. Cl.
CPC ............ *B01D 45/16* (2013.01); *B01D 45/08* (2013.01); *B01D 45/12* (2013.01); *B01J 8/0055* (2013.01);
(Continued)

(58) Field of Classification Search
CPC ........ B01D 45/04; B01D 45/08; B01D 45/12; B01D 45/16; B01J 8/005; B01J 8/0055;
(Continued)

(56) References Cited

U.S. PATENT DOCUMENTS 4,591,427 A * 5/1986 Krug ................... B01J 8/005
                                                    208/153
4,664,888 A * 5/1987 Castagnos, Jr. ........ B01J 8/0055
                                                    422/144
(Continued)

OTHER PUBLICATIONS

EP Response to Office Action dated Feb. 9, 2016; from EP counterpart Application No. 13792778.6.
(Continued)

*Primary Examiner* — Jason M Greene
(74) *Attorney, Agent, or Firm* — Dinsmore & Shohl LLP

(57) ABSTRACT

An improved process and an improved apparatus for minimizing attrition of catalyst particles, especially propane dehydrogenation catalyst particles, entrained in a combined flow of such particles and an entraining gas in a catalyst recovery means during separation of such particles from the entraining gas, by use of a pre-treatment step in which the combined flow is at a rate between 7.6 and 15.2 meters per second are provided.

10 Claims, 2 Drawing Sheets

(51) Int. Cl.
*B01J 8/00* (2006.01)
*B01J 8/18* (2006.01)
*B01J 8/34* (2006.01)
*B01D 45/08* (2006.01)
*B01D 45/12* (2006.01)

(52) U.S. Cl.
CPC .......... *B01J 8/1809* (2013.01); *B01J 8/1827* (2013.01); *B01J 8/1872* (2013.01); *B01J 8/34* (2013.01); *B04C 3/00* (2013.01); *B01J 2208/00991* (2013.01)

(58) Field of Classification Search
CPC ...... B01J 8/0065; B01J 8/1809; B01J 8/1827; B01J 8/1872; B01J 8/34; B04C 3/00
See application file for complete search history.

(56) References Cited

U.S. PATENT DOCUMENTS

| | | |
|---|---|---|
| 5,176,815 A | 1/1993 | Lomas |
| 6,022,390 A * | 2/2000 | Jakkula .................. B01D 45/12 55/345 |
| 6,533,844 B1 * | 3/2003 | Hiltunen ................ B01D 45/16 55/345 |
| 8,361,202 B2 | 1/2013 | Andreux et al. |
| 2007/0049782 A1 * | 3/2007 | Patel ...................... B01D 45/12 585/639 |
| 2010/0025295 A1 * | 2/2010 | Mehlberg ............... B01D 45/12 208/113 |
| 2010/0175553 A1 | 7/2010 | Andreux |
| 2015/0298037 A1 * | 10/2015 | Pretz ..................... B01J 8/1827 95/271 |

OTHER PUBLICATIONS

PCT/US2013/064753 International Search Report and Written Opinion dated Feb. 14, 2014, 9 pages.
PCT/US2013/064753 International Preliminary Report on Patentability dated May 14, 2015, 8 pages.
Chinese Office Action received Oct. 11, 2016; from Chinese counterpart Application No. 201380055249.6.
Chinese Response to Office Action received Jan. 23, 2016; from counterpart Chinese Application No. 201380055249.6.

* cited by examiner

PROCESS AND APPARATUS FOR MINIMIZING ATTRITION OF CATALYST PARTICLES

FIELD OF INVENTION

This invention relates generally to a process and apparatus therefor, for minimizing attrition of alkane or alkyl aromatic dehydrogenation catalyst particles, especially propane dehydrogenation (PDH) catalyst particles, entrained in an entraining gas in a catalyst recovery means during separation of such particles from the entraining gas.

BACKGROUND

Particulate catalysts used in certain fluid-solid reaction systems, such as alkane or alkyl aromatic dehydrogenation, must typically be separated from the reaction product and either recycled into the reaction system or regenerated prior to being recycled into the reaction system. In either case, the solid catalyst particles must also be separated from the regenerator system effluent. The most common method of separating the solid catalyst particles is by maintaining the regenerator bed at velocities near (0.914 meter per second (m/s) (3 feet/second (ft/s)) and allowing particle disengagement to reduce the quantity of catalyst, by controlling entrainment, to one or more high velocity cyclone separators, such that the gas flow velocity upon impacting a first cyclone separator may range from 16.8 meters per second (m/s) (55.1 ft.s) to 25.9 m/s (85 ft/s). Such high gas velocities result in high impact velocities of the solid catalyst particles on the cyclone walls, resulting in catalyst particle attrition. Bubbling bed regenerators for a dehydrogenation system, wherein the dehydrogenation catalyst and entraining gas exits the bubbling bed at about 1 meter per second are well known.

Dehydrogenation catalysts are known to contain higher platinum concentration on the outer surfaces of the particle than in the bulk of the catalyst particles due to migration of expensive metal components, such as Pt, Ga, Pd, Au, Ag, at high temperature. Therefore, as the dehydrogenation catalyst particles are attrited, the most active catalyst component may be lost as fine particles, leaving the remaining catalyst particle with a lower activity. Dehydrogenation catalysts tend to be very expensive, primarily because of the Pt component, which is most affected by catalyst particle attrition. However, fluid-solid reaction system catalyst particles further include other costly components, such as alumina-silica support. Therefore, minimization of catalyst attrition, particularly of PDH catalyst particles, would be beneficial to the economic viability of such fluid-solid reaction systems, and particularly to PDH processes.

SUMMARY OF THE INVENTION

The invention provides an improved process and apparatus therefor, for minimizing attrition of alkane or alkyl aromatic dehydrogenation catalyst particles, especially propane dehydrogenation (PDH) catalyst particles, entrained in an entraining gas in a catalyst recovery means during separation of such particles from the entraining gas by pre-treating the combined catalyst particle and entraining gas stream with a low velocity gas/solids separations means prior to contacting a high velocity separation means.

In one embodiment, the invention provides an improved process for minimizing attrition of catalyst particles entrained in a combined flow of such particles and an entraining gas in a catalyst recovery means during separation of such particles from the entraining gas, which process comprises causing the combined flow to contact a high velocity separation means at a gas flow velocity of 16.8 meters per second to 25.9 meters per second and thereby remove from said combined flow at least 99.8 percent of the catalyst particles, wherein the improvement comprises: subjecting the combined flow having an axis of flow direction to a pre-treatment step that precedes contact of the combined flow with the separation means at the high gas flow velocity of from 16.8 meters per second to 25.9 meters per second, the pre-treatment step occurring at a lower gas flow velocity within a range of from 7.6 meters per second to 15.2 meters per second in combination with a directional change away from the combined gas flow, which directional change is at least 90 degrees from the axis of flow direction and, which pre-treatment step combination of velocity and direction change causes removal from the combined flow greater than 80 percent of the catalyst particles such that less than 20 percent of the catalyst particles contact the high velocity separation means, the improved process providing a total catalyst attrition rate calculated in accord with the correlation $r=Ku^2/\sqrt{\mu}$, where r is attrition rate (mass of catalyst attrited per hour per mass of catalyst impacted per hour), K is a catalyst specific attrition rate constant, u is the impact velocity (meters per second), and $\mu$ is solids-to-gas loading ratio (mass of catalyst to mass of gas), that is at least fifteen percent less than the total catalyst attrition rate without the pre-treatment step.

In an alternative embodiment, the invention further provides an improved apparatus for minimizing attrition of catalyst particles entrained in a combined flow of such particles and an entraining gas in a catalyst recovery means during separation of such particles from the entraining gas, which improved apparatus comprises one or more high velocity cyclone separators designed to receive the combined flow at a gas flow velocity of from 16.8 meters per second to 25.9 meters per second and thereby remove from said combined flow at least 99.8 percent of the catalyst particles, wherein the improvement comprises: a combined flow deflector situated above dip legs of the one or more cyclone separators and wherein the combined flow deflector is capable of changing the velocity and direction thereby removing from the combined flow of greater than 80 percent of the catalyst particles from the combined stream of catalyst particles and entraining gas, such that less than 20 percent of the catalyst particles impact the high velocity separation means, wherein the combined gas flow velocity following contact with the combined flow deflector is from 7.6 meters per second to 15.2 meters per second and direction of combined gas flow following contact with the combined flow deflector is at least 90 degrees from the axis of combined flow prior to contact with the combined flow deflector.

BRIEF DESCRIPTION OF THE DRAWINGS

For the purpose of illustrating the invention, the drawings show a form that is exemplary; it being understood, however, that this invention is not limited to the precise arrangements and instrumentalities shown.

DETAILED DESCRIPTION OF THE INVENTION

Figure 1:
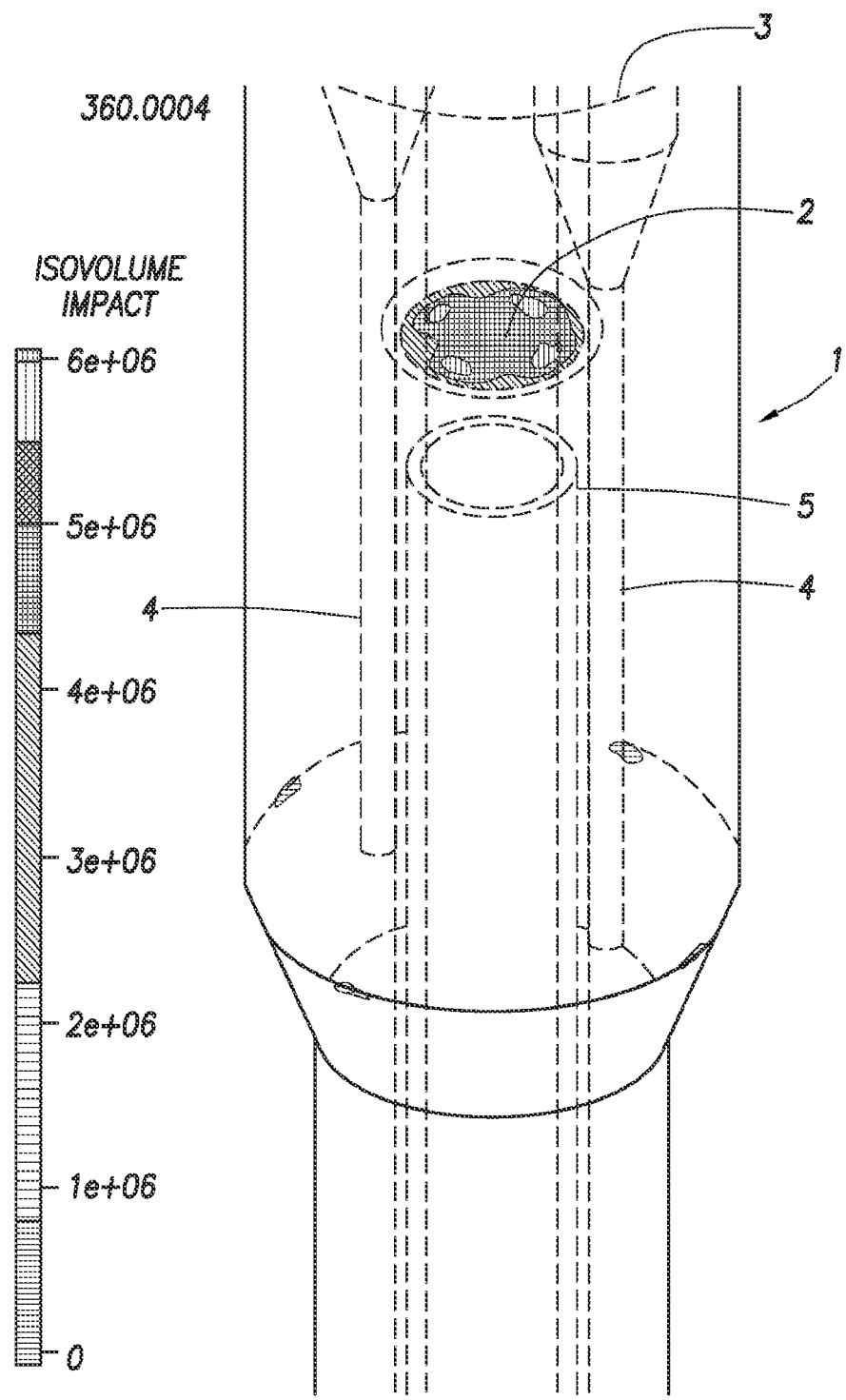
FIG. 1 is a schematic of first embodiment of the improved apparatus.

Embodiments of the invention provide an improved process for minimizing attrition of catalyst particles entrained in a combined flow of such particles and an entraining gas in a catalyst recovery means during separation of such particles from the entraining gas, which process comprises causing the combined flow to contact a high velocity separation means at a gas flow velocity of 16.8 meters per second to 25.9 meters per second and thereby remove from said combined flow at least 99.8 percent of the catalyst particles and improved apparatus for minimizing attrition of catalyst particles entrained in a combined flow of such particles and an entraining gas in a catalyst recovery means during separation of such particles from the entraining gas.

The improved process and apparatus provide a total catalyst attrition rate calculated in accordance with the correlation from Reppenhagen and Werther, POWDER TECHNOLOGY, Vol. 113 pp. 55-69 (2000); namely, $r = Ku^2/\sqrt{\mu}$, where r is attrition rate (mass of catalyst attrited per hour per mass of catalyst impacted per hour), K is a catalyst specific attrition rate constant, u is the impact velocity (meters per second), and μ is solids-to-gas loading ratio (mass of catalyst to mass of gas), that is at least fifteen percent less than the total catalyst attrition rate without the pre-treatment step.

While particularly suitable as applied to separation of propane dehydrogenation catalysts, the improved process also has utility in separating other catalyst particles in fluid-solid reaction systems, including for example, other alkane dehydrogenation catalysts, such as ethane dehydrogenation catalysts, butane dehydrogenation catalysts, pentane dehydrogenation catalysts, ethylbenzene dehydrogenation catalysts, propylbenzene dehydrogenation catalysts, and methylethylbenzene dehydrogenation catalysts. The improved process could be useful in separating yet other catalyst particles useful in fluid-solid reaction systems, such as methanol to olefins, alcohols to olefins, hydrocarbon cracking catalysts, hydrocarbon dewaxing catalysts, and hydrocracking catalysts.

Separation means useful in embodiments of the process include cyclone separators and other devices using centrifugal force or impact force to enable particle separation, such as vortex separators.

In a particular embodiment, the catalyst specific attrition rate constant, K, is approximately $100 \times 10^{-9}$ s$^2$/m In one embodiment, the high velocity separation means is a two-stage cyclone system that includes a primary cyclone operating at a gas inlet flow velocity within a range from 16.8 meters per second to 22.9 meters per second, and a secondary cyclone operating at a gas inlet flow velocity within a range of from 18.3 meters per second to 25.9 meters per second.

In an alternative embodiment, the instant invention provides an improved process and improved apparatus therefor, in accordance with any of the preceding embodiments, except that the combined flow deflector is a disk. In a particular embodiment, the disk has a diameter of 1 to 2 times the diameter of the riser. All individual values and subranges from 1 to 2 are included herein and disclosed herein; for example, the diameter of the disk can be from 1.5 to 2 times the diameter of the riser, or in the alternative, the diameter of the disk can be from 1 to 1.5 times the diameter of the riser, or in the alternative, the diameter of the disk can be from 1.25 to 1.75 times the diameter of the riser.

In a particular embodiment, the area between the riser hat and the riser top has a cylindrical area of 1 to 3 times the area of the riser itself. All individual values and subranges from 1 to 3 are included herein and disclosed herein; for example, the opening between the riser and the disk can be from 2 to 3 times the area of the riser, or in the alternative, the opening between the riser and the disk can be from 1 to 2 times the area of the riser, or in the alternative, the opening between the riser and the disk can be from 1.5 to 2 times the area of the riser, or in the alternative, the opening between the riser and the disk can be from 1.75 to 2.25 times the area of the riser. One such exemplary embodiment is partially shown in FIG. 1. The improved apparatus 1 is shown with a two stage cyclone separator system having two pairs of cyclones 3, each with a dip leg 4 extending below the placement of the combined flow deflector 2. As shown in FIG. 1, the combined flow detector 2 is in the shape of a disk placed at a height of the riser 5 such that the combined gas flow impacts the combined flow deflector at a velocity within the range of from 7.6 to 15.2 meters per second.

Figure 2:
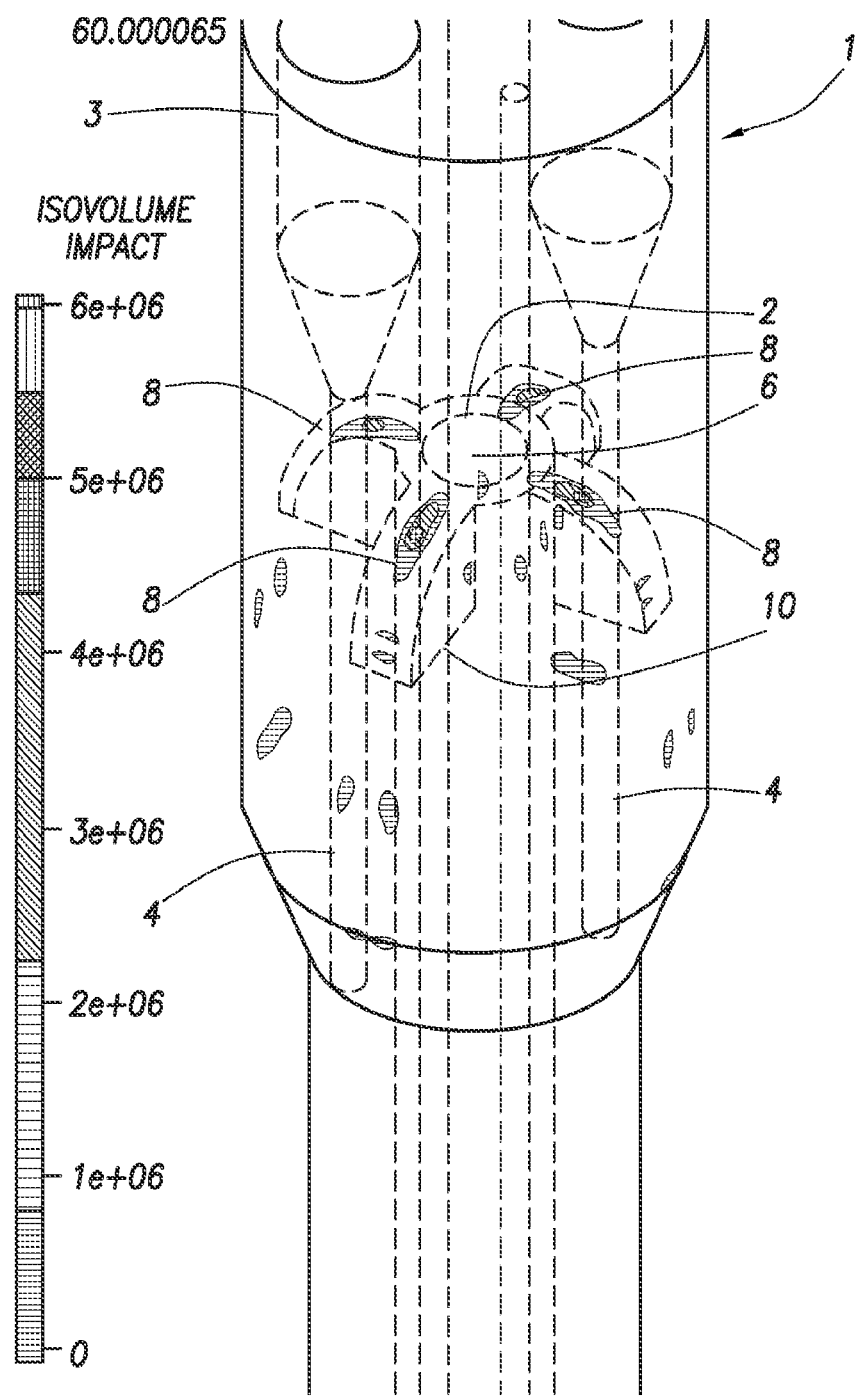
FIG. 2 is a schematic of a second embodiment of the improved apparatus.

In another alternative embodiment, the instant invention provides an improved process and improved apparatus therefor, in accordance with any of the preceding embodiments, except that the combined flow deflector comprises a plate having a centerpoint and outer edge and a plurality of arms extending from the outer edge, wherein the arms comprise a curve axially away from and downward of the centerpoint. One such exemplary embodiment is shown in FIG. 2. Referring to FIG. 2, the improved apparatus 1 is again shown with a two phase cyclone separator system having two cyclone separators 3, each cyclone separator having a dip leg 4 which extends below the combined flow deflector 2. As shown in FIG. 2, the combined flow deflector 2 has a centerpoint 6 from which four arms 8 extend. Each arm 8 is curved outwardly and downwardly from the centerpoint 6. An optional arm sideplate 10 is shown in FIG. 2.

In an alternative embodiment, the combined flow deflector may be shaped as a downwardly curved plate wherein a centerpoint of the plate is the highest point of the deflector. In yet another embodiment, the combined flow deflector may be shaped as a hemisphere with a pole of the hemisphere being the highest point of the deflector. In another embodiment, the combined flow deflector is shaped as a cone with the cone peak being the highest point of the deflector. In another embodiment, the combined flow deflector is shaped as a frustum, having a top surface with a smaller area than a bottom surface, with the top surface being the highest point of the deflector. As can be seen from the foregoing, a skilled artisan would understand that the combined flow deflector may be of any appropriate shape such that the velocity and direction of the combined flow is appropriately changed.

The improved process and/or improved apparatus of the present invention are useful in connection with those systems in which the gas flow velocity upon impact or connection with the separation means is between 16.8 meters per second (55 feet per second) and 25.9 meters per second (85 feet per second). All individual values and subranges between 16.8 meters per second and 25.9 meters per second are included herein and disclosed herein. For example, the improvements may be used in a system in which the gas flow velocity upon impact or connection with the separation means is between 16.8 and 25.9 meters per second, or in the alternative, between 16.8 and 20 meters per second, or in the alternative, between 18.5 and 24.5 meters per second, or in the alternative, between 22.6 and 25.9 meters per second.

The pre-treatment step and/or combined flow deflector of the present invention result in a change of gas flow velocity of the combined flow to a range of 7.6 to 15.2 meters per second. All individual values and subranges from 7.6 to 15.2 meters per second are included herein and disclosed herein; for example, the pre-treating step may result in a lower limit of gas flow velocity of 7.6; 8.6; 9.6; 10.6; 11.6; 12.6; 13.6; or 14.6 meters per second to an upper limit of 8; 9; 10; 11; 12; 13; 14; or 15.2 meters per second. For example, the gas flow velocity following the pre-treating step, or contact with the combined flow deflector, may be from 7.6 to 15.2 meters per second; or in the alternative, from 9.6 to 13.8 meters per second, or in the alternative, from 7.8 to 12.5 meters per second, or in the alternative, from 13 to 15.2 meters per second.

The pre-treatment step and/or combined flow deflector of the present invention result in a change in the axis of flow direction of the combined flow of at least 90 degrees from the axis of flow direction. All individual values and subranges of at least 90 degrees from the axis of flow direction are included herein and disclosed herein. For example, the change in combined flow direction from the axis of flow direction, following the pre-treating step or contact with the combined flow deflector, may be at least 90 degrees, or in the alternative, at least 120 degrees, or in the alternative, at least 150 degrees, or in the alternative, at least 180 degrees.

The pre-treating step and/or combined flow deflector of the present invention causes removal from the combined flow of greater than 80 percent of the catalyst particles in the combined flow. All individual values and subranges of greater than 80 percent of the catalyst particles are included herein and disclosed herein. For example, the pre-treating step or combined flow deflector may remove from the combined flow of greater than 80 percent of the catalyst particles in the combined flow, or in the alternative, the pre-treating step or combined flow deflector may remove from the combined flow of greater than 90 percent of the catalyst particles in the combined flow, or in the alternative, the pre-treating step or combined flow deflector may remove from the combined flow of greater than 94 percent of the catalyst particles in the combined flow, or in the alternative, the pre-treating step or combined flow deflector may remove from the combined flow of greater than 98 percent of the catalyst particles in the combined flow, or in the alternative.

The improved process and/or combined flow deflector according to the present invention provides a total catalyst attrition rate calculated in accord with the correlation $r = Ku^2/\sqrt{\mu}$, where r is attrition rate (mass of catalyst attrited per hour per mass of catalyst impacted per hour), K is a catalyst specific attrition rate constant, u is the impact velocity (meters per second), and $\mu$ is solids-to-gas loading ratio (mass of catalyst to mass of gas), that is at least fifteen percent less than the total catalyst attrition rate without the pre-treatment step. All individual values and subranges of at least fifteen percent decrease in catalyst attrition are included herein and disclosed herein. For example, the decrease in catalyst attrition may be from a lower limit of 15, 17, 19, 21, 23 or 25 percent in comparison to the total catalyst attrition without the pre-treatment step and/or contact with the combined flow deflector.

The attrition rate constant may be obtained by operating a unit while measuring the attrition rate while varying gas velocities and solids loadings to regress the value of K. Reppenhagen and Werther generated attrition rates, r, as a function of $u^2$ and $\mu$ which is documented in POWDER TECHNOLOGY, Vol. 113, p. 64, Table 4. The measured rates were regressed to calculate values of K.

In a fluidized regenerator system, the entrainment gas is primarily a flue gas that results from combustion of fuels including methane, coke and hydrogen. Therefore, the gas primarily contains nitrogen, oxygen, carbon dioxide and water. The entrainment flux E is given by the equation $E = \int K^*_{i\infty} y \, dx$ where y(x)dx is the mass fraction of particles of size x to x+dx in the bed and $K^*_{i\infty}$ is the elutriation constant (in kg/m$^2$/s) given by the correlation from Geldart et al. (1979), TRANSACTIONS OF THE INSTITUTE OF CHEMICAL ENGINEERS Vol. 57 pp. 269-275, as $$K^*_{i\infty}(x) = 14.5 U^{2.5} \exp\left[-5.4 \frac{u_T(x)}{U}\right]$$

where U is the superficial gas velocity in the bed (in m/s), and $u_T(x)$ is the terminal velocity of a particle of size x. For typical particles with density 130 lb/ft$^3$ and a log normal particle size distribution with median 75 μm and geometric standard deviation 1.6 subject to fluidizing gas with density 0.04 lb/ft$^3$ and gas viscosity 0.04 cP at a superficial velocity ranging from 1 ft/s to 4 ft/s, the entrained solids flux ranges from 54 lb/ft$^2$/hr to 5,600 lb/ft$^2$/hr (see FIG. 4) resulting in a catalyst to gas mass ratio ranging from 0.37 to 9.73.

EXAMPLES

The following examples illustrate the present invention but are not intended to limit the scope of the invention. The comparative examples were generated using the experimentally derived equation provided by Reppenhagen and Werther along with a representative attrition rate constant determined by Reppenhagen and Werther, which can be found in Table 4 on page 64, namely 100×10$^{-9}$ s$^2$/m$^2$ which is in the range of other catalysts that were evaluated. The actual flow rates and process parameters were calculated based on a generic process model that is known to work for a PDH regeneration process. The separation efficiency of the low velocity separation device was calculated using a Barracuda Computational Particle Fluid Dynamic Model. The entrainment rate for a conventional style regenerator was calculated based on Geldarts experimental work referenced above.

Comparative Example 1 was processed in a conventional bubbling bed regenerator with a two stage high velocity cyclone separation system. Catalyst with a particle density 2,082 kg/m$^3$ (130 lb/ft$^3$) and a log normal particle size distribution with median 75 μm and geometric standard deviation 1.6 was fluidized by gas with density 0.64 kg/m$^3$ (0.04 lb/ft$^3$) and viscosity 0.04 cP at a superficial velocity of 0.91 m/s (3 ft/s) in a bed with diameter 1.75 m (5.74 ft). The Geldart et al. (1979) entrainment correlation then gives an entrained solids flux of 20,905 kg/m$^2$ hr (4,284 lb/ft$^2$/hr), or 50,285 kg/hr (110,859 lb/hr), and a catalyst to gas mass flow ratio of 9.92. At a 19.8 m/s (65 ft/s) primary cyclone inlet velocity with a catalyst constant of 100×10$^{-9}$ s$^2$/m$^2$, the Reppenhagen and Werther (2000) correlation results in 0.626 kg/hr (1.38 lb/hr) of attrited catalyst. With a 99.997% separation efficiency 1.51 kg/hr (3.33 lb/hr) of catalyst are sent to the secondary cyclones, which have a 22.9 kg/s (75 ft/s) inlet velocity, thereby producing 0.00005 kg/hr (0.0001 lb/hr) of attrited fines. The total rate of catalyst attrition was then 0.627 kg/hr (1.383 lb/hr).

Inventive Example 1 was modeled as being processed in a system as shown in FIG. 2 with a pretreatment low velocity separation step followed by a two stage high velocity cyclone separation system, the result would be as follows. Here, 68,040 kg/hr (150,000 lb/hr) of catalyst and 4,556 kg/hr (10,044 lb/hr) of gas impact the flow deflector at 10.7 m/s (35 ft/s) resulting in 0.20 kg/hr (0.44 lb/hr) of attrited catalyst. According to a computational particle fluid dynamic simulation (conducted using Barracuda software from CPFD Software LLC (Albuquerque, N. Mex., USA)) the collection efficiency of the flow deflector was 96% resulting in 2,761 kg/hr (6,000 lb/hr) of catalyst and 5,071 kg/hr (11,179 lb/hr) of gas (some from the annular space) entering the primary cyclone separator. At 19.8 m/s (65 ft/s) inlet velocity, this generates 0.146 kg/hr (0.321 lb/hr) of attrited catalyst. With a 99.98% separation efficiency in the primary cyclones (separation efficiency is lower than previous example because of lower cyclone loading), 0.544 kg/hr (1.2 lb/hr) enter the secondary cyclones at 22.9 kg/s (75 ft/s) generating 0.0027 kg/s (0.006 lb/hr) of attrited catalyst. Thus the total catalyst attrition rate is 0.349 kg/hr (0.770 lb/hr); which is 55% of that seen in Comparative Example 1.

The present invention may be embodied in other forms without departing from the spirit and the essential attributes thereof, and, accordingly, reference should be made to the appended claims, rather than to the foregoing specification, as indicating the scope of the invention.

What is claimed is:

1. An improved process for minimizing attrition of catalyst particles entrained in a combined flow of such particles and an entraining: gas in a catalyst recovery means during separation of such particles from the entraining gas, which process comprises causing the combined flow to contact a high velocity separation means at a was flow velocity of 16.8 meters per second to 25.9 meters per second and thereby remove from said combined flow at least 99.8 percent of the catalyst particles, wherein the improvement comprises:

subjecting the combined flow, having an axis of flow direction, to a pre-treatment step that precedes contact of the combined flow with the separation means at the high gas flow velocity of from 16.8 meters per second to 25.9 meters per second, the pre-treatment step occurring at a lower gas flow velocity a range of from 7.6 meters per second to 15.2 meters per second in combination with a directional change away from the combined gas flow, which directional change is at least 90 degrees from the axis of flow direction and, which pre-treatment step combination of velocity and direction change causes removal from the combined flow greater than 80 percent of the catalyst particles such that less than 20 percent of the catalyst particles contact the high velocity separation means, the improved process providing a total catalyst attrition rate calculated in accord with the correlation $r=Ku^2/\sqrt{\mu}$, where r is attrition rate (mass of catalyst attrited per hour per mass of catalyst impacted per hour), K is as catalyst specific attrition rate constant, u is the impact velocity (meters per second), and $\mu$ is solids-to-gas loading ratio (mass of catalyst to mass of gas), that is at least fifteen percent less than the total catalyst attrition rate without the pre-treatment step; and wherein said high velocity separation means comprises a combined flow deflector, wherein said a combined flow deflector is a disk.

2. The improved process of claim 1, wherein the total catalyst attrition rate provided by the improved process is at least fifty percent less than the total catalyst attrition rate in the absence of the pre-treatment step.

3. The improved process of claim 1, wherein the separation means is a two-stage high velocity cyclone system that includes a primary cyclone operating at a gas flow velocity within a range from 16.8 meters per second to 22.9 meters per second, and a secondary cyclone operating at a gas flow velocity within a range of from 18.3 meters per second to 25.9 meters per second.

4. The improved process of Claim 1, wherein the directional, change is within a range of from least 110 degrees up to 180 degrees away from the axis of flow direction.

5. The improved process of claim 1, wherein the pre-treatment step causes removal from the combined flow of greater than 90 percent of the catalyst particles such that less than 10 percent of the catalyst particles contact the separation means.

6. The improved process of claim 1, wherein the improved process provides a total catalyst attrition rate calculated in accord with the correlation $r=Ku^2/\sqrt{\mu}$ where r is attrition rate (mass of catalyst attrited per hour per mass of catalyst impacted per hour), K is a catalyst specific attrition rate constant, u is the impact velocity (meters per second), and $\mu$ is solids-to-gas loading ratio (mass of catalyst to mass of gas), that is at least twenty-one percent less than the total catalyst attrition rate without the pre-treatment step.

7. The improved process claim 1, wherein the catalyst particles comprise propane dehydrogenation catalyst.

8. The improved process of claim 1, wherein the catalyst specific attrition rate constant, K, is $100 \times 10^{-9}$ $s^2/m$.

9. An improved apparatus for minimizing attrition of catalyst particles entrained in a combined flow of such particles and an entraining gas in a catalyst recovery means during separation of such particles from the entraining gas, which improved apparatus comprises one or more high velocity cyclone separators designed to receive the combined flow at a gas flow velocity of from 16.8 meters per second to 25.9 meters per second and thereby remove from said combined flow at least 99.8 percent of the catalyst particles, wherein the improvement comprises:

a combined flow deflector situated above dip legs of the one or more cyclone separators and wherein the combined flow deflector is capable of changing the velocity and direction thereby removing from the combined flow of greater than 80 percent of the catalyst particles from the combined stream of catalyst particles and entraining gas, such that less than 20 percent of the catalyst particles impact the high velocity separation means, wherein the combined gas flow velocity following contact with the combined flow deflector is from 7.6 meters per second to 15.2 meters per second and direction of combined gas flow following contact with the combined flow deflector is at least 90 degrees from the axis of combined flow prior to contact with the combined flow deflector, and wherein said a combined flow deflector is disk.

10. The improved apparatus of claim 9, wherein the one or more cyclone separators comprise a two-stage high velocity cyclone system that includes a primary cyclone operating at a gas flow velocity within a range from 16.8 meters per second to 22.9 meters per second, and a secondary cyclone operating at a gas flow velocity within a range of from 18.3 meters per second to 25.9 meters per second.

* * * * *

UNITED STATES PATENT AND TRADEMARK OFFICE
CERTIFICATE OF CORRECTION

PATENT NO. : 9,687,765 B2
APPLICATION NO. : 14/434973
DATED : June 27, 2017
INVENTOR(S) : Matthew Pretz et al.

It is certified that error appears in the above-identified patent and that said Letters Patent is hereby corrected as shown below:

Column 7, Claim 1, Line 29:
"and an entraining: gas in a catalyst recovery means during"
Should read:
--and an entraining gas in a catalyst recovery means during--;

Column 7, Claim 1, Line 32:
"high velocity separation means at a was flow velocity of 16.8"
Should read:
--high velocity separation means at a gas flow velocity of 16.8--;

Column 7, Claim 1, Line 40:
"ring at a lower gas flow velocity a range of from 7.6"
Should read:
--ring at a lower gas flow velocity within a range of from 7.6--;

Column 7, Claim 1, Line 54:
"catalyst impacted per hour), K is as catalyst specific"
Should read:
--catalyst impacted per hour), K is a catalyst specific--;

Column 8, Claim 4, Line 11:
"tional, change is within a range of from least 110 degrees up"
Should read:
--tional change is within a range of from at least 110 degrees up--;

Column 8, Claim 7, Line 26:
"7. The improved process claim 1, wherein the catalyst"
Should read:
--7. The improved process of claim 1, wherein the catalyst--; and Signed and Sealed this
Sixth Day of March, 2018

Andrei Iancu
*Director of the United States Patent and Trademark Office*

CERTIFICATE OF CORRECTION (continued)
U.S. Pat. No. 9,687,765 B2

Column 8, Claim 9, Line 55:
"flow deflector is disk."
Should read:
--flow deflector is a disk.--.